US007383634B2

(12) United States Patent
Haataja et al.

(10) Patent No.: US 7,383,634 B2
(45) Date of Patent: Jun. 10, 2008

(54) METHOD OF ASSEMBLING A CABLE ROUTING SYSTEM

(75) Inventors: Timothy Jon Haataja, Prior Lake, MN (US); Brian L. Johnson, Maple Grove, MN (US); Wayne Albin Johnson, Rosemount, MN (US); Thomas Walter Kampf, Minnetonka, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 268 days.

(21) Appl. No.: 10/626,106

(22) Filed: Jul. 23, 2003

(65) Prior Publication Data

US 2004/0104313 A1 Jun. 3, 2004

Related U.S. Application Data

(62) Division of application No. 09/578,300, filed on May 25, 2000, now Pat. No. 6,739,795.

(51) Int. Cl.
*B21D 47/00* (2006.01)
*F16L 3/00* (2006.01)
*F16L 27/00* (2006.01)

(52) U.S. Cl. ......................... 29/897.3; 29/434; 29/469; 403/387; 248/68.1

(58) Field of Classification Search ............... 29/897.3, 29/464, 466, 469, 434; 248/68.1, 49, 58; 403/387, 300, 375, 341; 174/95, 72 R, 48, 174/49, 68.1
See application file for complete search history.

(56) References Cited

U.S. PATENT DOCUMENTS 689,894 A 12/1901 Lutz
1,590,569 A * 6/1926 Fisk ............................ 439/17
1,986,965 A 1/1935 Frank
1,992,574 A 2/1935 Jenkins
2,805,401 A 9/1957 Crowley
2,975,805 A 3/1961 Horn
3,013,644 A * 12/1961 Smith et al. .................. 52/666
3,351,699 A * 11/1967 Merckle ............... 174/35 GC
3,436,047 A 4/1969 Foltz
3,592,239 A 7/1971 Adler
3,636,984 A * 1/1972 Rauhauser ................. 138/155
4,130,463 A 12/1978 Klavir (Continued)

FOREIGN PATENT DOCUMENTS

DE 1 850 468 4/1962

(Continued)

OTHER PUBLICATIONS

ADC Telecommunications brochure entitled "FiberGuide® Fiber Management Systems," 33 pages, dated Oct. 1995.

(Continued)

*Primary Examiner*—Jermie Cozart
(74) *Attorney, Agent, or Firm*—Merchant & Gould P.C.

(57) ABSTRACT

A telescoping cable trough section is provided including first and second U-shaped trough sections which are slideably received with each other. One trough section includes slots, and the other includes flanges received in the slots for mating the two trough sections together to form the telescoping cable trough section.

19 Claims, 16 Drawing Sheets

18 10 14c 14 32 12 14a 30 14 14c 14a 14b 26 24 14b 16

U.S. PATENT DOCUMENTS 4,480,859 A 11/1984 Rueckl et al.
4,516,874 A * 5/1985 Yang et al. ................. 403/313
4,652,017 A 3/1987 Drechsel
4,781,401 A 11/1988 Sharp
5,067,678 A 11/1991 Henneberger et al.
5,160,811 A 11/1992 Ritzmann
5,161,580 A 11/1992 Klug
5,215,338 A 6/1993 Kimura et al.
5,240,209 A 8/1993 Kutsch
5,271,585 A 12/1993 Zetena, Jr.
5,316,243 A 5/1994 Henneberger
5,316,244 A 5/1994 Zetena, Jr.
5,335,349 A 8/1994 Kutsch et al.
5,375,891 A 12/1994 Sicotte et al.
5,409,266 A 4/1995 Baker
5,503,354 A 4/1996 Lohf et al.
5,752,781 A 5/1998 Haataja et al.
5,803,653 A 9/1998 Zuffetti
5,923,753 A 7/1999 Haataja et al.
5,924,260 A 7/1999 Austin et al.
5,937,131 A 8/1999 Haataja et al.
5,995,699 A 11/1999 Vargas et al.
6,037,538 A 3/2000 Brooks
6,076,779 A * 6/2000 Johnson ....................... 248/49
6,118,075 A * 9/2000 Baker et al. .............. 174/72 A
6,143,984 A 11/2000 Auteri
6,174,231 B1 1/2001 Bodin
6,206,456 B1 3/2001 Steury et al.

FOREIGN PATENT DOCUMENTS

DE 37 37 187 A1 5/1988
JP 10-164743 6/1998
WO WO 89/02179 3/1989

OTHER PUBLICATIONS

Warren & Brown & Staff brochure pages entitled "lightpaths," Issue 2, 11 pages, dated 1995.

ADC Telecommunications brochure entitled "FiberGuide™ Fiber Management System," 6 pages, dated Jun. 1989.

ADC Telecommunications brochure entitled "ADC FiberGuide® System Express Exit™ 2=2," 2 pages, dated May 1999.

ADC Telecommunications brochure entitled "FiberGuide® Fiber Management Systems," 37 pages, dated Jun. 1998.

* cited by examiner 10
12
14
14a
14b
14c
16
18
24
26
30
32

24
35
28
12
90
26

30
51
51
24
12
86
26
32

30
12
94
24
26
32

84
82
54
34
76
86
56
36
34
26
24
12

24
42
52
52
49
49
49
48
50
54
54
44
44
40
46
56
58
60

42
52
48
12
12
24
40

26
70
74
82
86
98
72
74
80
76

70
74
26
78
16
16
82
84
98
72

METHOD OF ASSEMBLING A CABLE ROUTING SYSTEM

CROSS REFERENCE TO RELATED APPLICATIONS

This application is a divisional of application Ser. No. 09/578,300, filed May 25, 2000, which application is incorporated herein by reference now U.S. Pat. No. 6,739,795.

FIELD OF THE INVENTION

This application relates to a system for the management and routing of optical fiber cables and other telecommunications cables. Particularly, this application relates to a trough member for use with other troughs, couplings, and fittings.

BACKGROUND OF THE INVENTION

In the telecommunications industry, the use of optical fibers for signal transmissions is accelerating. With the increased utilization of optical fiber systems, optical fiber cable management requires industry attention.

One area of optical fiber management that is necessary is the routing of optical fibers from one piece of equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another.

When routing optical fibers, it is desirable that a routing system will be easy to assemble, readily accessible and adaptable to changes in equipment needs. Accordingly, such routing systems include a plurality of trough members such as troughs and couplings for forming the cable routing paths. The trough system members are joined together by couplings. U.S. Pat. No. 5,067,678 to Henneberger et al dated Nov. 26, 1991 concerns a cable routing system that includes a plurality of troughs and fittings. The '678 patent further discloses a coupling (element 250 in FIG. 1 of the '678 patent) for joining trough members and fittings. With best reference to FIGS. 6-7 of the '678 patent, a plurality of hardware is disclosed for joining the trough members. U.S. Pat. Nos. 5,316,243 and 5,752,781 show additional examples of couplings.

Several concerns arise with cable routing systems, including the ease of installation of the troughs, couplings, and fittings. A further concern is removing components at a later date, such as to substitute different functional elements into the system. Rigid systems provide adequate fiber support and protection. However, such prior art systems can be somewhat difficult to install, and modify later.

SUMMARY OF THE INVENTION

The present invention relates to a telescoping cable trough section for a cable routing system. The cable trough section includes first and second U-shaped trough sections extending in a longitudinal direction and each including a terminal end and a receiving end. The receiving ends are slideably mated for sliding movement along the longitudinal direction. The terminal ends can be joined to other system components, including couplings for joining to other trough sections or fittings in the cable routing system.

Preferably, the terminal ends of the first and second trough sections include ends shaped to mate with the same coupling. Preferably, the terminal ends define the same coupling profile.

In one preferred embodiment, each of the first and second trough sections includes two upright walls. One of the first and second trough sections includes longitudinal slots formed in the upright walls. The other of the first and second trough sections includes longitudinal flanges on the upright walls which are slideably received in the longitudinal slots of the other trough section.

In one preferred embodiment, a retention system retains the first and second trough sections together so that the parts do not slide apart before installation in the system.

DETAILED DESCRIPTION OF THE PREFERRED EMBODIMENT

Figure 1:
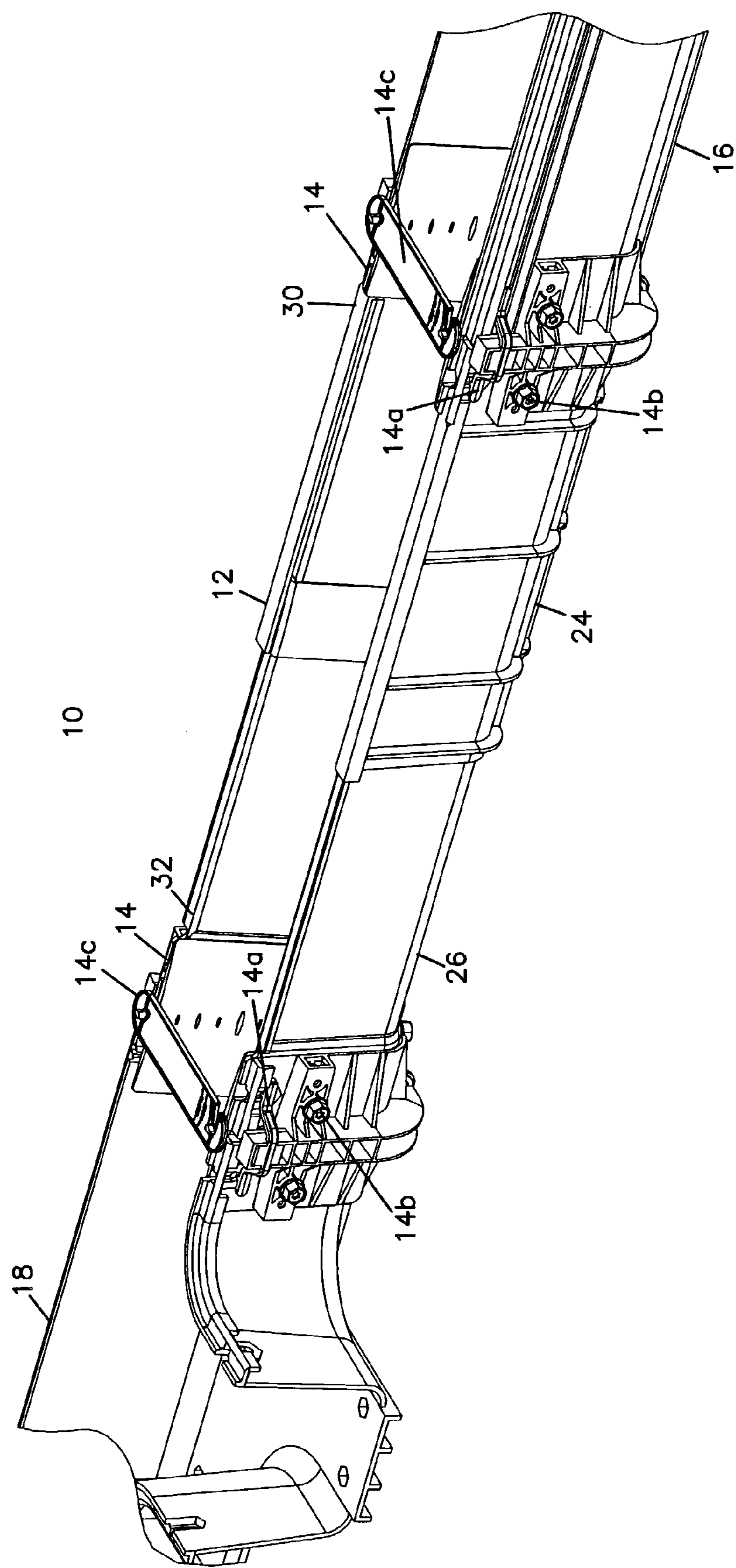
FIG. 1 is a top perspective view of a portion of a cable routing system, including a telescoping trough in accordance with the present invention, and a horizontal trough section, and a fitting as exemplary components used with the telescoping trough.
Figure 2:
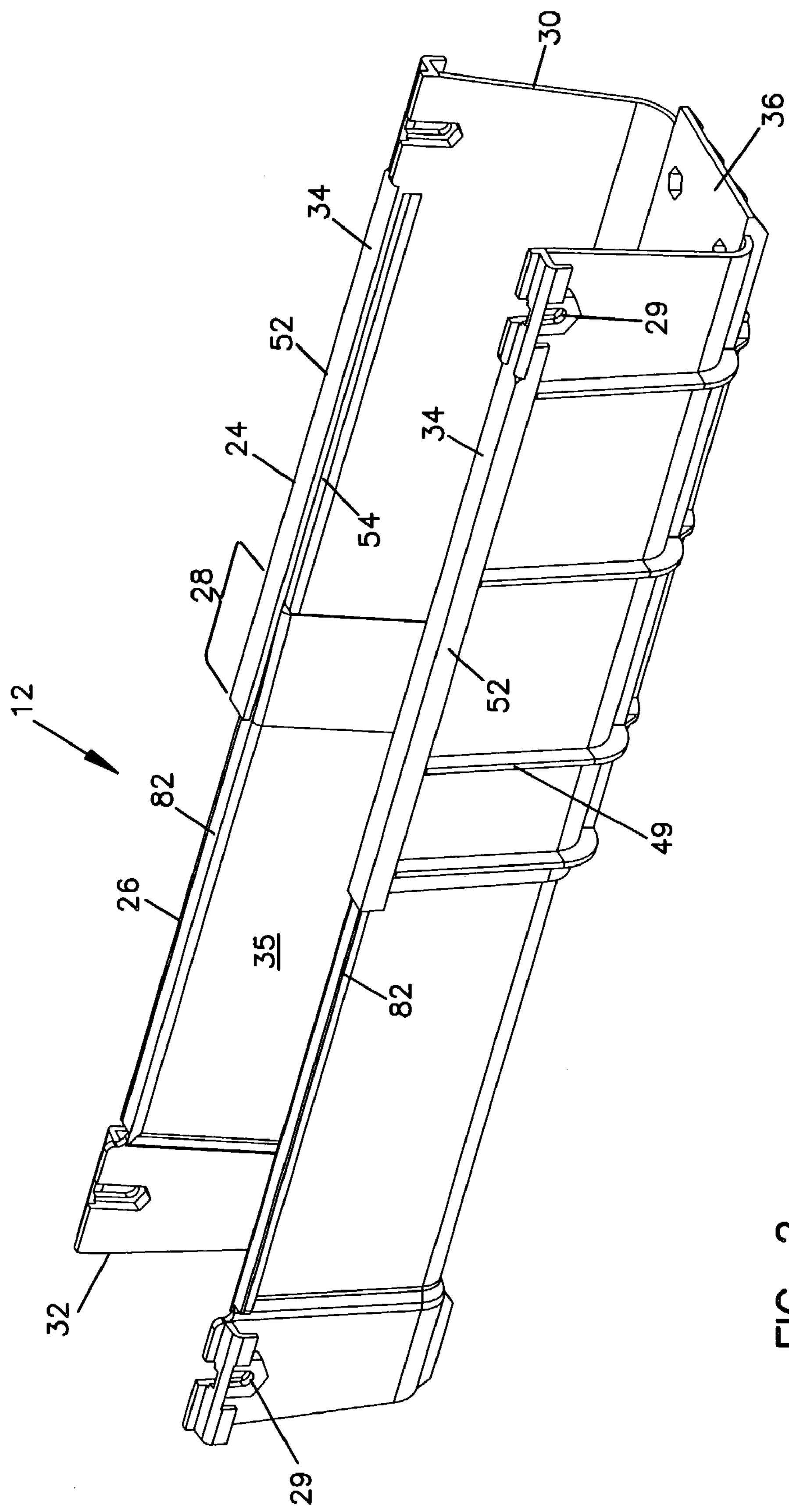
FIG. 2 is a top perspective view of the telescoping trough of FIG. 1.
Figure 3:
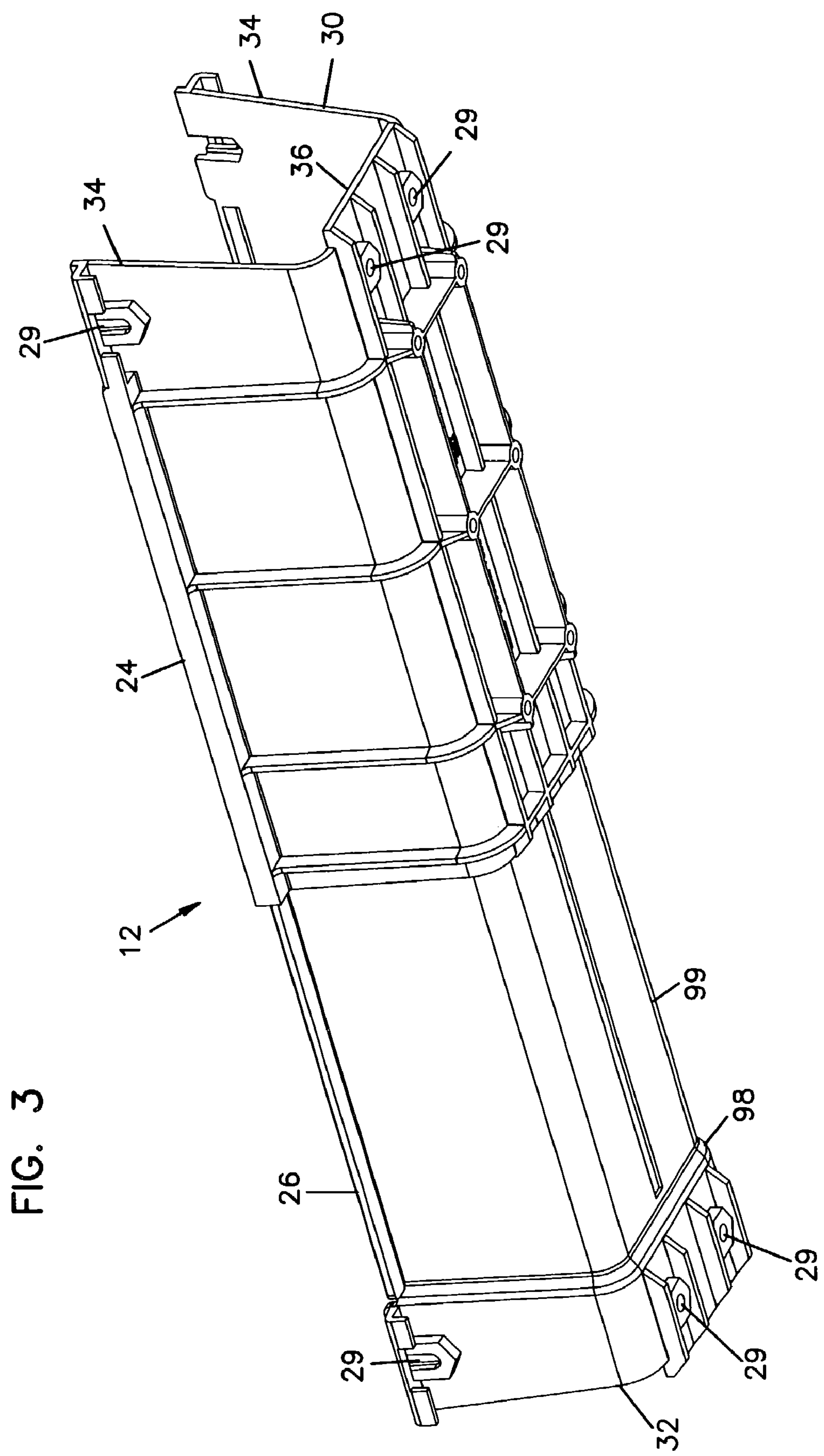
FIG. 3 is a bottom perspective view of the telescoping trough.
Figure 4:
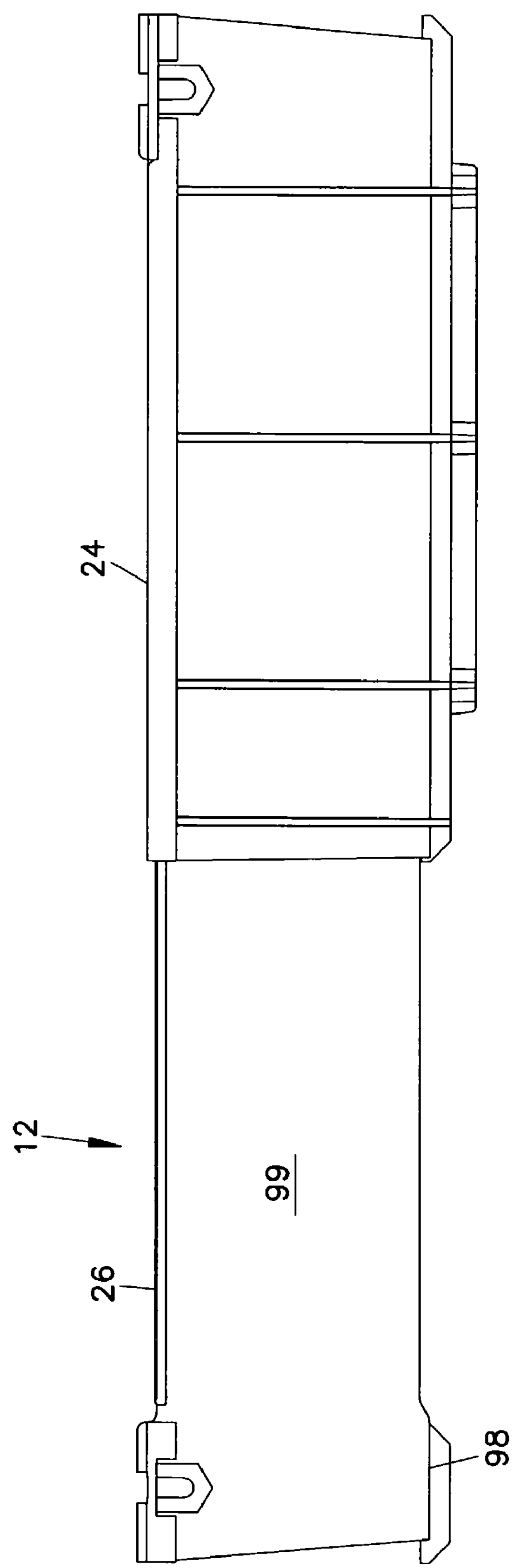
FIG. 4 is a side view of the telescoping trough.

Referring now to FIG. 1, a cable routing system 10 is shown in accordance with the principals of the present invention. Cable routing system 10 includes a telescoping trough 12 mounted to a coupling 14 on one terminal end 30. Coupling 14 joins telescoping trough 12 to horizontal trough section 16. An opposite terminal end 32 of telescoping trough 12 is mounted to a second coupling 14 which is mounted to a fitting 18 (T-fitting). End 30 can be spaced from end 32 in a telescoping manner.

Couplings 14 are described in greater detail in U.S. Pat. No. 5,752,781, the disclosure of which is incorporated by reference. Terminal ends 30, 32 are received in generally U-shaped channels in couplings 14. Resilient tabs **14*a* engage holes 29 in terminal ends 30,32. Fasteners 14*b* of coupling 14 are screwed down to secure couplings 14 to trough 12. Cable retention members 14*c* are added to help retain the cables in the various trough and fitting components. Additional couplings, troughs and fittings useful in system 10 with trough 12** are disclosed in U.S. Pat. Nos. 5,067,678; 5,316,243; 5,923,753 and 5,937,131, the disclosures of which are also incorporated by reference.

Telescoping trough 12 has a variable or changeable length so as to be usable in a variety of circumstances in system 10 or other systems. Trough 12 is useful in system 10 where the distance between couplings 14 is any distance between a maximum and minimum for the amount of extension for telescoping trough 12. This allows for less precise design and assembly of system 10. Instead of telescoping trough 12, a single piece trough would have to be custom cut or manufactured to fit between couplings 14.

Because the length of telescoping trough 12 is variable, telescoping trough 12 can drop into position between couplings 14, in a slightly retracted state, and then be expanded to complete the cable pathway between couplings 14. Once expanded, resilient tabs 14*a*, and fasteners 14*b* secure trough 12 in place. Further, system 10 can be accessed for modification by releasing tabs 14*a*, and fasteners 14*b*, and then retracting telescoping trough 12 to allow its removal.

Figure 5:
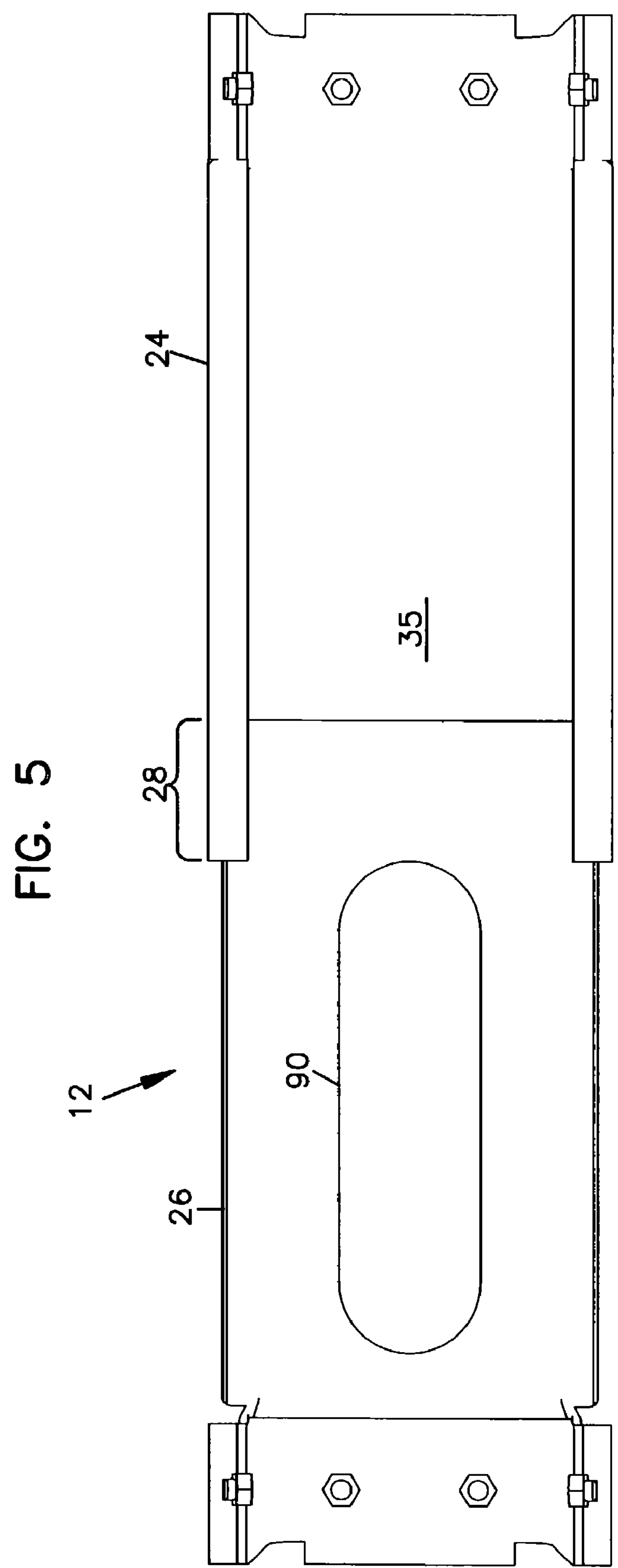
FIG. 5 is a top view of the telescoping trough.
Figure 6:
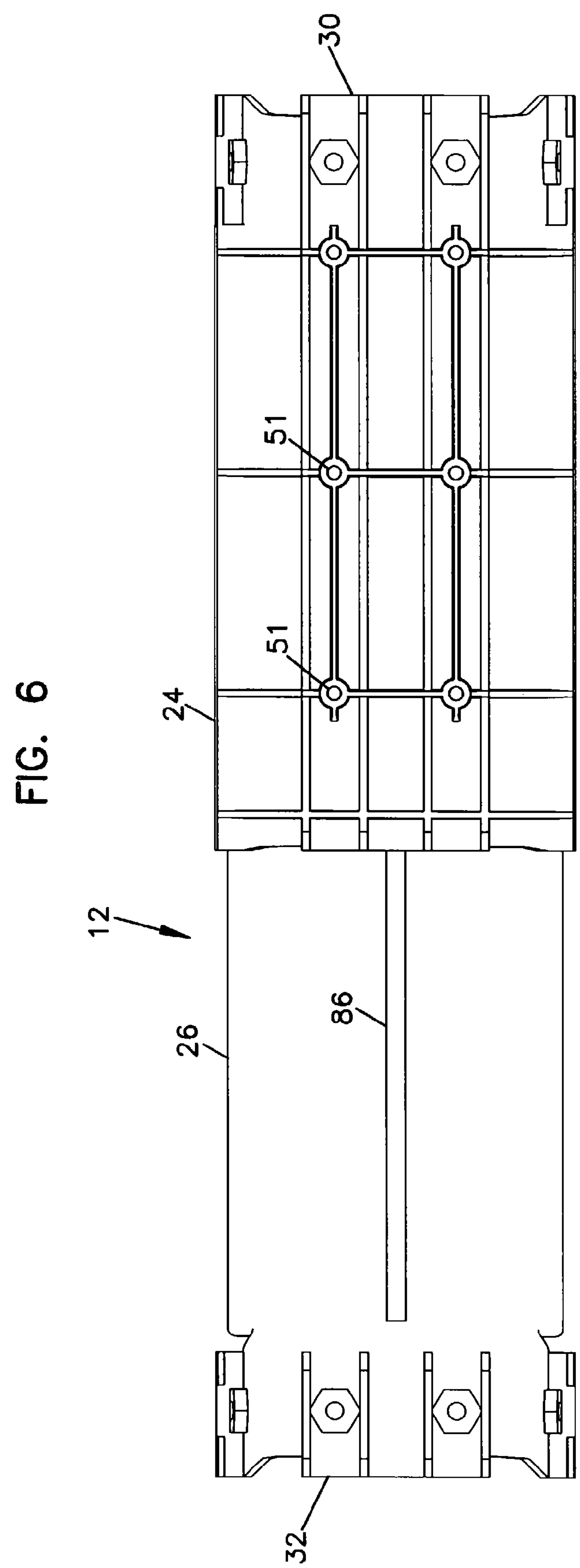
FIG. 6 is a bottom view of the telescoping trough.
Figure 7:
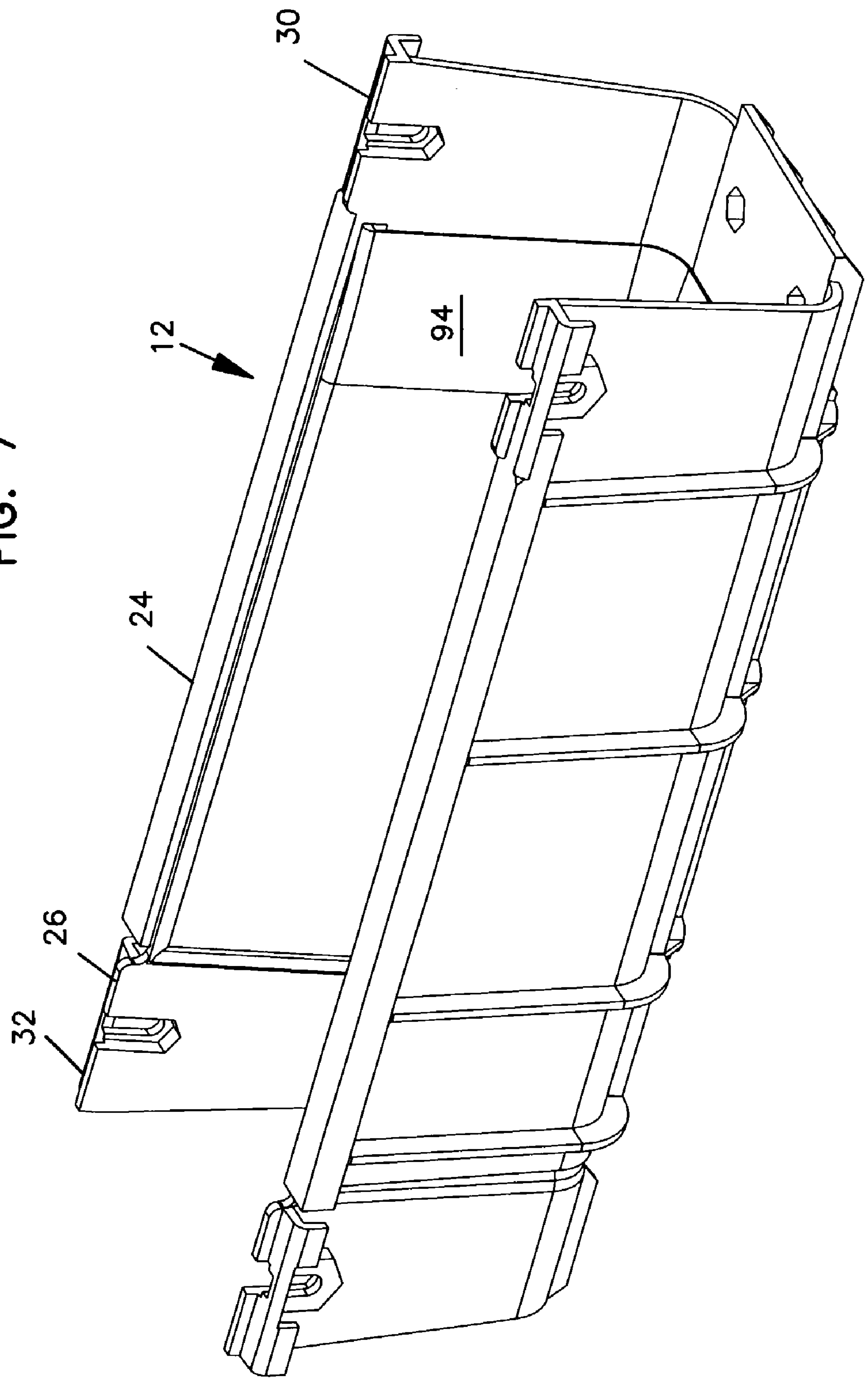
FIG. 7 is a top perspective view of the telescoping trough in a retracted state.
Figure 8:
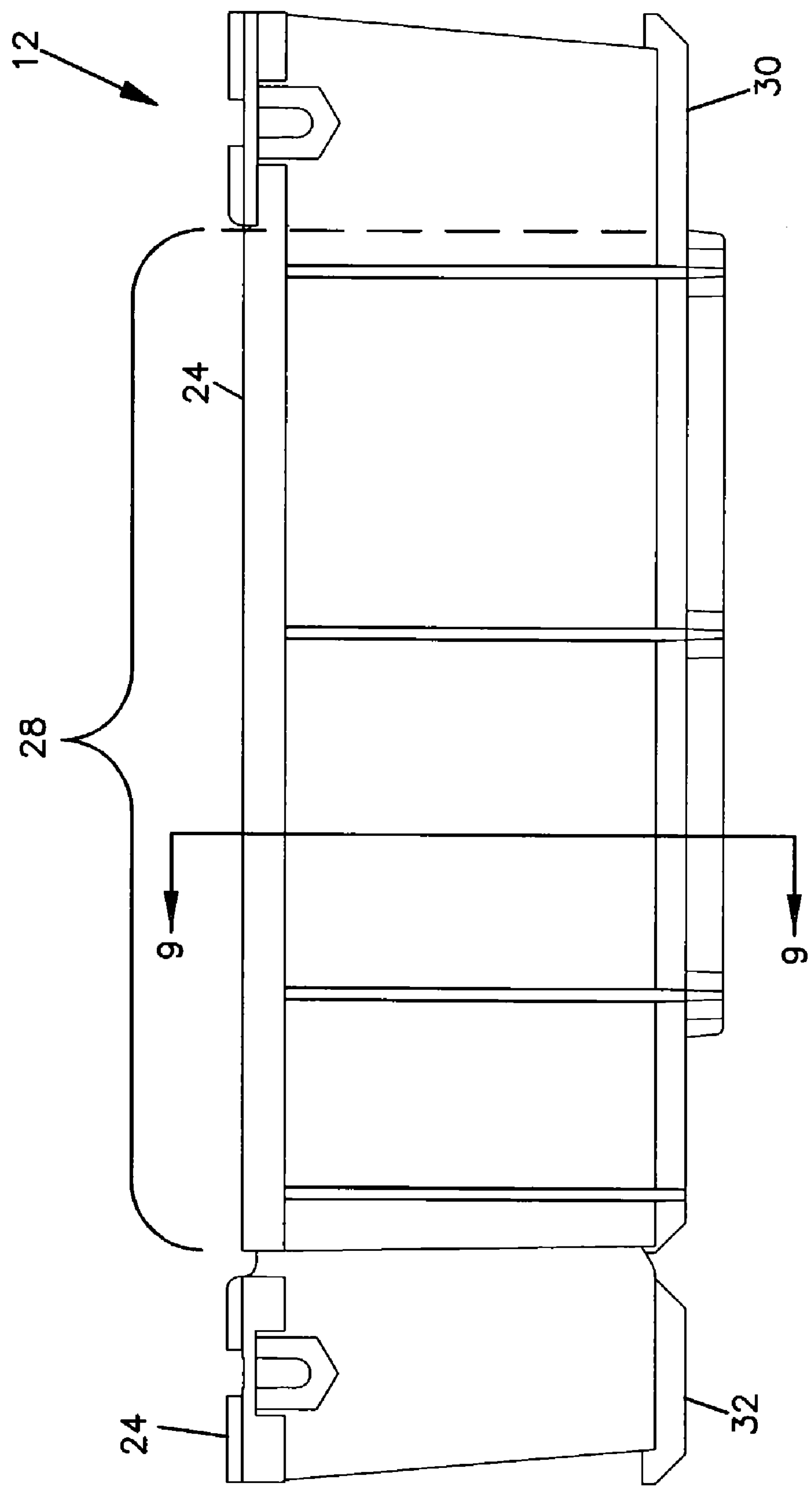
FIG. 8 is a side view of the telescoping trough of FIG. 7.

Telescoping trough 12 includes a first trough section 24 and a second trough section 26 which are slideably mated with one another. First trough section 24 and second trough section 26 include a variable overlap portion 28 (compare FIGS. 5 and 8). Terminal ends 30, 32 of telescoping trough 12 each join to one of couplings 14. Terminal ends 30, 32 each have a profile which permits either end 30, 32 to be mated with either coupling 14. Such a shaping for the ends allows ease of assembly since trough 12 can be inserted in either orientation for ends 30, 32. Preferably, the end profiles of trough 12 are identical. Terminal ends 30, 32 also mate with other couplings or fittings as desired.

Telescoping trough 12 defines a generally U-shaped channel with upright walls 34 extending from a base wall 36. Interior 35 defines the cable pathway for the optical fiber (or copper) cables.

First trough section 24 includes a receiving end 40, and an opposite terminal end 42. First trough section 24 defines a generally U-shaped channel including upright wall sections 44 extending from a base wall section 46. First trough section 24 includes an outside surface 48 and an inside surface 50. Outside surface 48 can include a variety of shapes including strengthening ribs 49 and structure 51 for mounting to system support hardware which holds system 10 in place, such as in a ceiling mount.

First trough section 24 includes upper flanges 52 at an upper portion of upright wall sections 44 each defining a slot 54 for mating with portions of second trough section 26, as will be described below in further detail. Base wall section 46 further includes a projecting tab 56 facing upwardly. Tab 56 includes a ramp surface 58, and a shoulder 60. Tab 56 is used to retain first and second trough sections 24, 26 together, as will be described below in further detail.

Second trough section 26 includes a receiving end 70, and an opposite terminal end 72. Upright wall sections 74 extend from base wall section 76. Second trough section 26 includes an outside surface 78 and an inside surface 80. At an upper portion of upright wall sections 74, upper flanges 82 extend outwardly for receipt in slots 54 of first trough section 24. In the mated state, inside surface 50 of first trough section 24 closely receives outside surface 78 of second trough section 26. Inside surface 80 and the exposed inside surface 50 not covered by second trough section 26, form a closed U-shaped trough for receipt of the cables passing through trough 12.

Flanges 82 each include small upper ridges 84 extending perpendicularly to flanges 82 to assist with a secure fit of flanges 82 in slots 54. Ridges 84 help fill the height of slots 54, yet do not promote binding of the parts during sliding movement (see FIG. 9).

Figure 9:
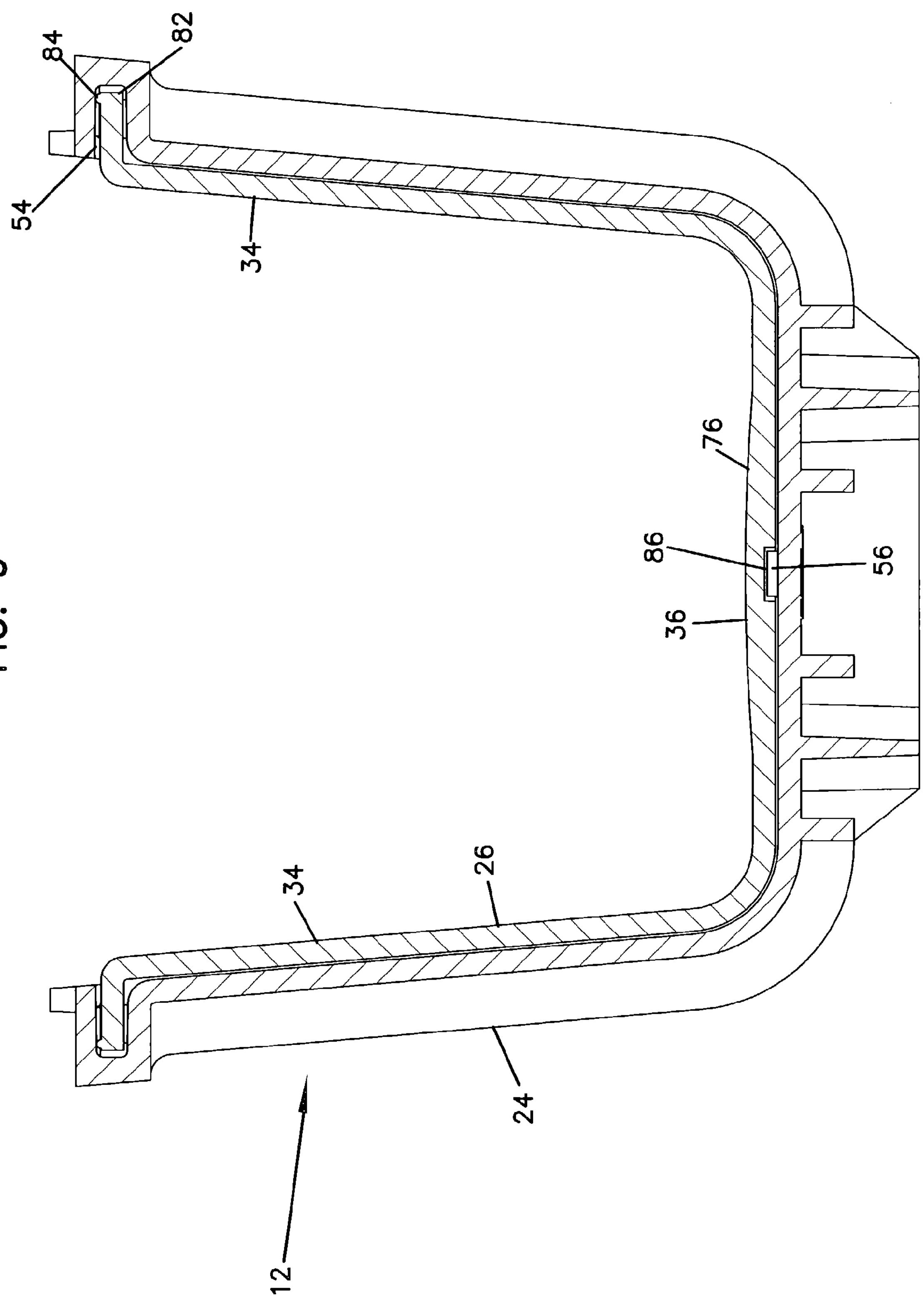
FIG. 9 is a cross-sectional end view of the telescoping trough, taken along lines 9-9 of FIG. 8.
Figure 10:
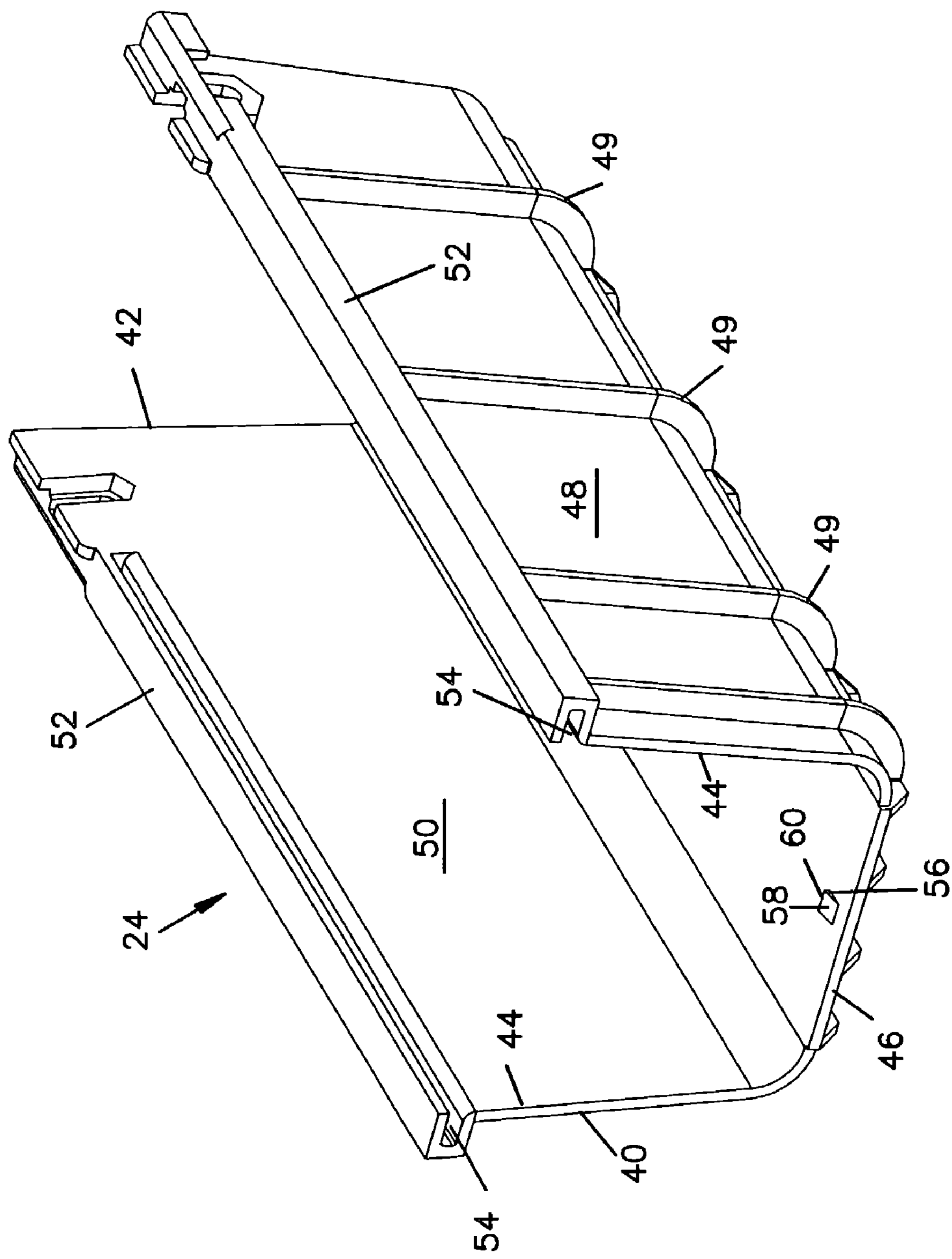
FIG. 10 is a top perspective view of the first trough section of the telescoping trough.
Figure 11:
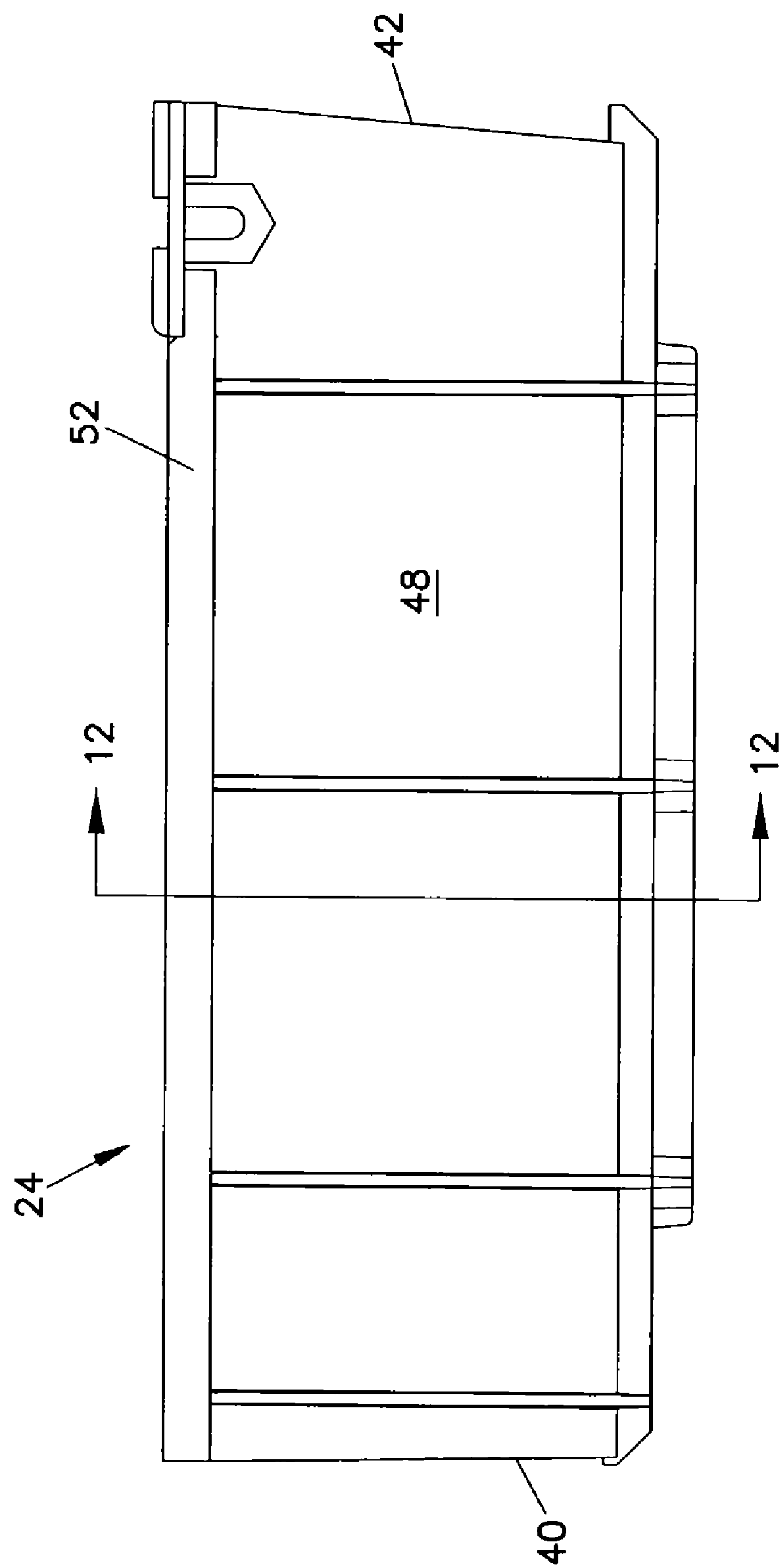
FIG. 11 is a side view of the first trough section.
Figure 12:
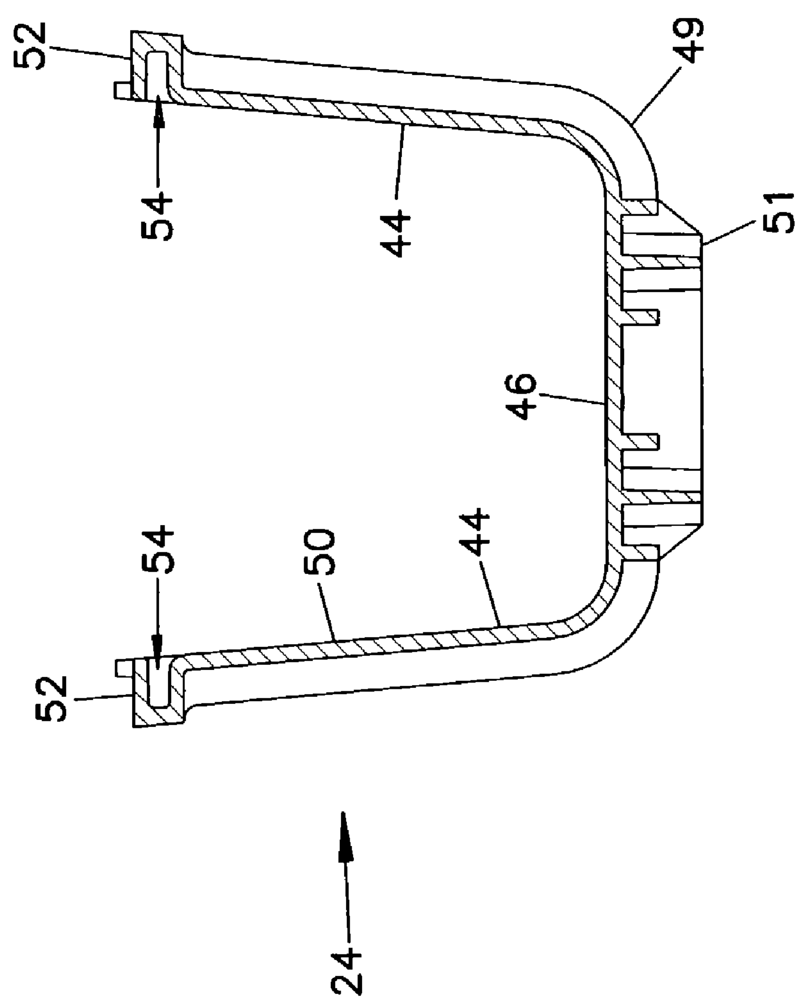
FIG. 12 is a cross-sectional end view of the telescoping trough, taken along lines 12-12 of FIG. 11.
Figure 13:
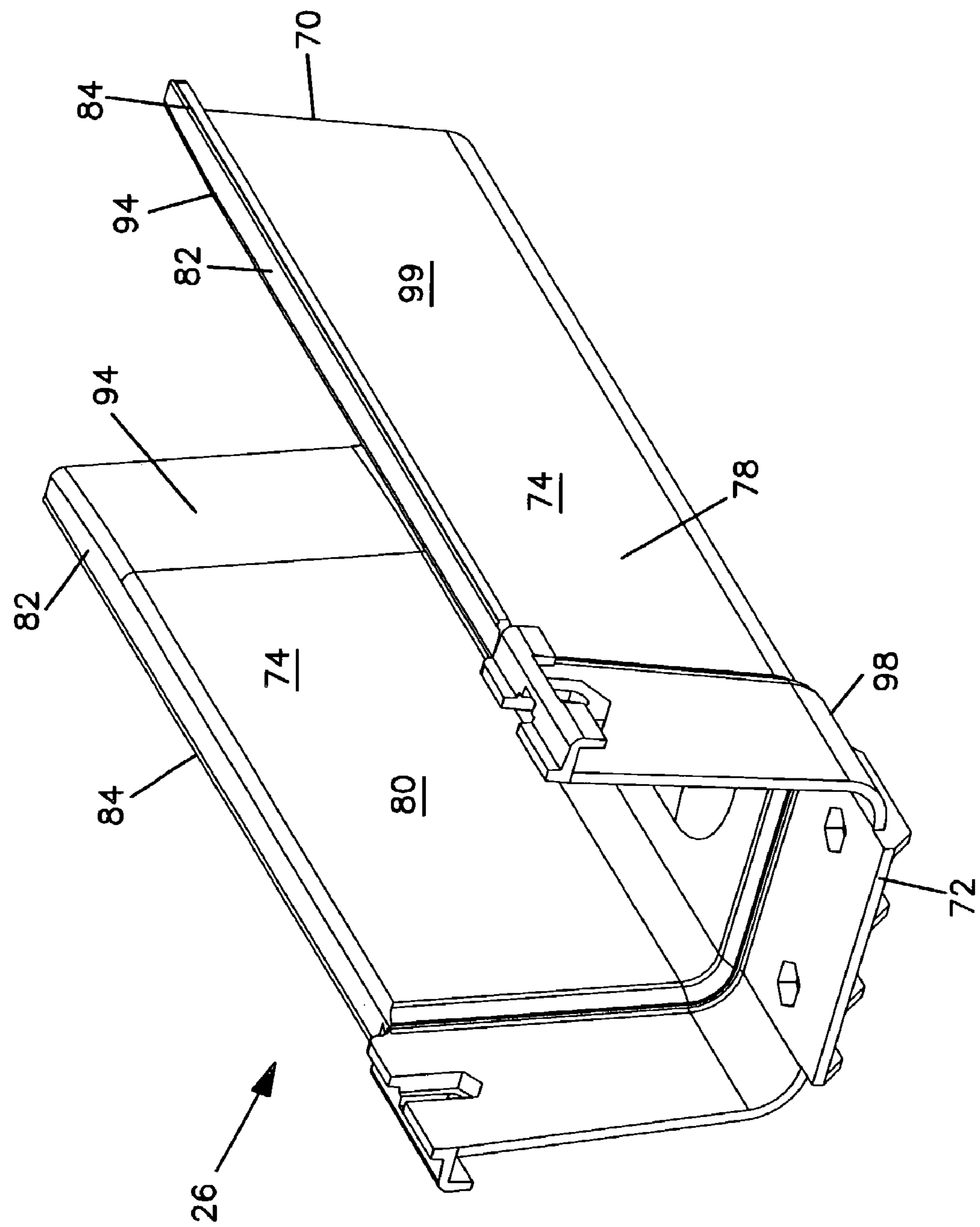
FIG. 13 is a top perspective view of the second trough section of the telescoping trough.
Figure 14:
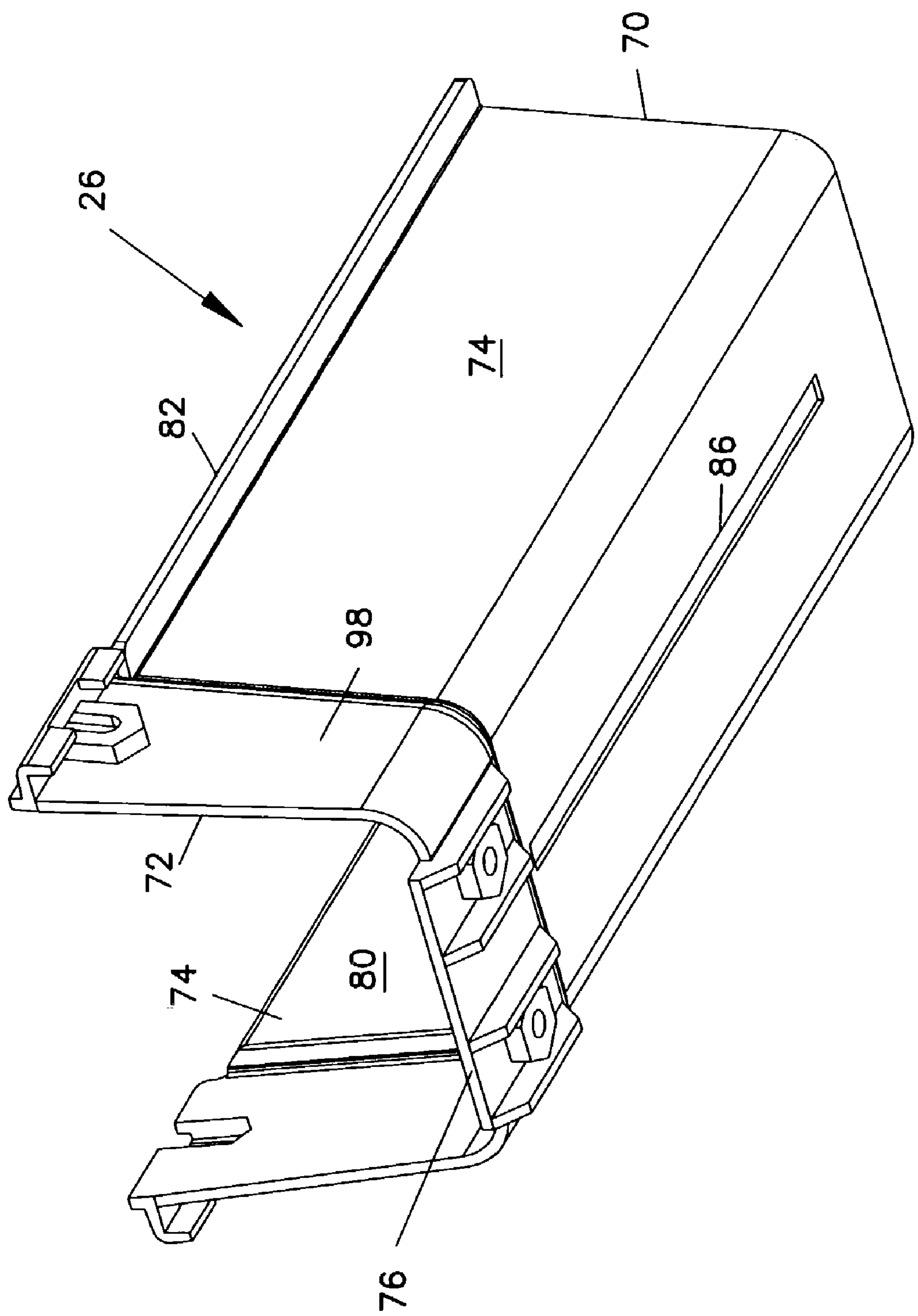
FIG. 14 is a bottom perspective view of the second trough section.
Figure 15:
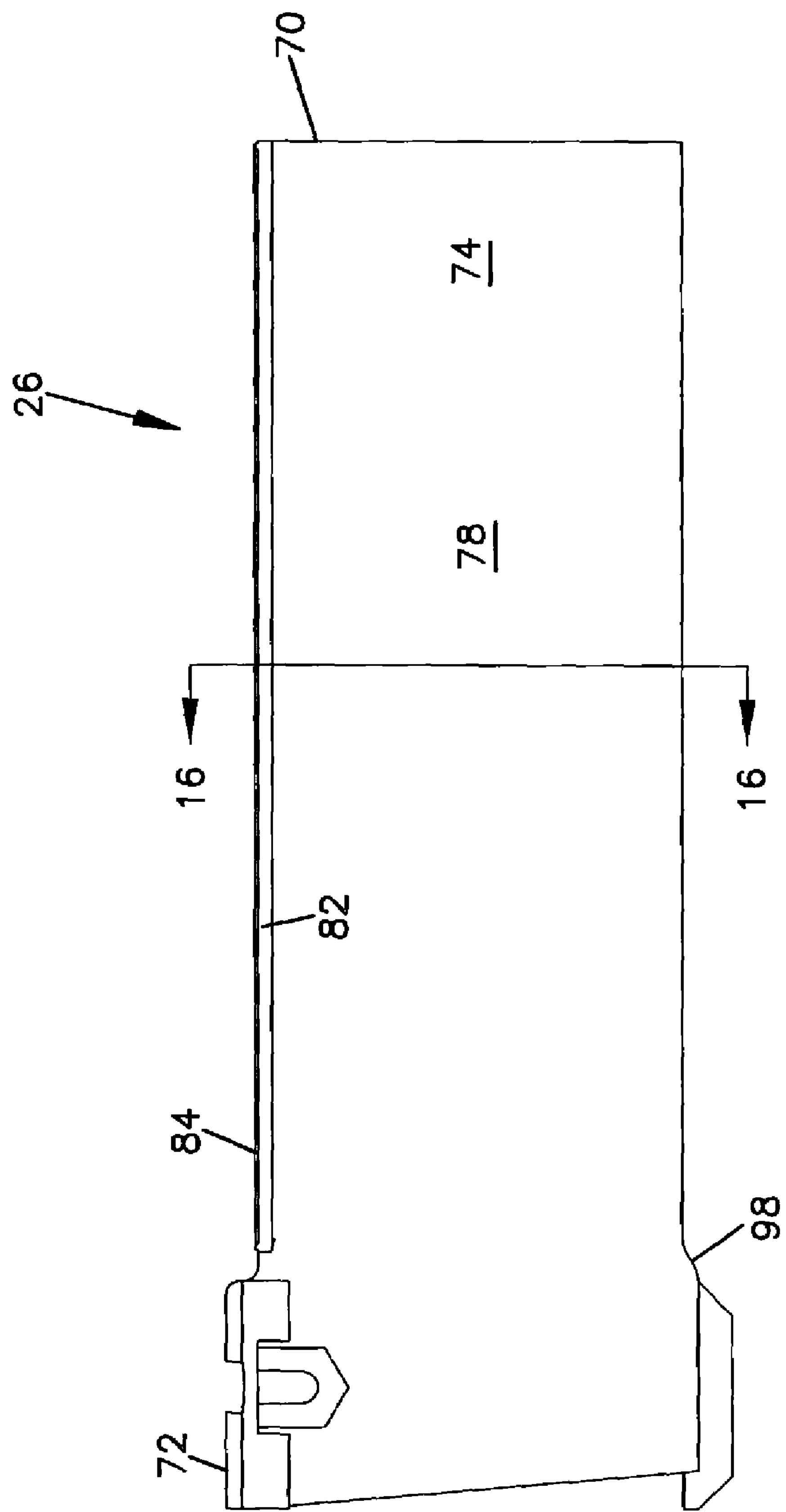
FIG. 15 is a side view of the second trough section.
Figure 16:
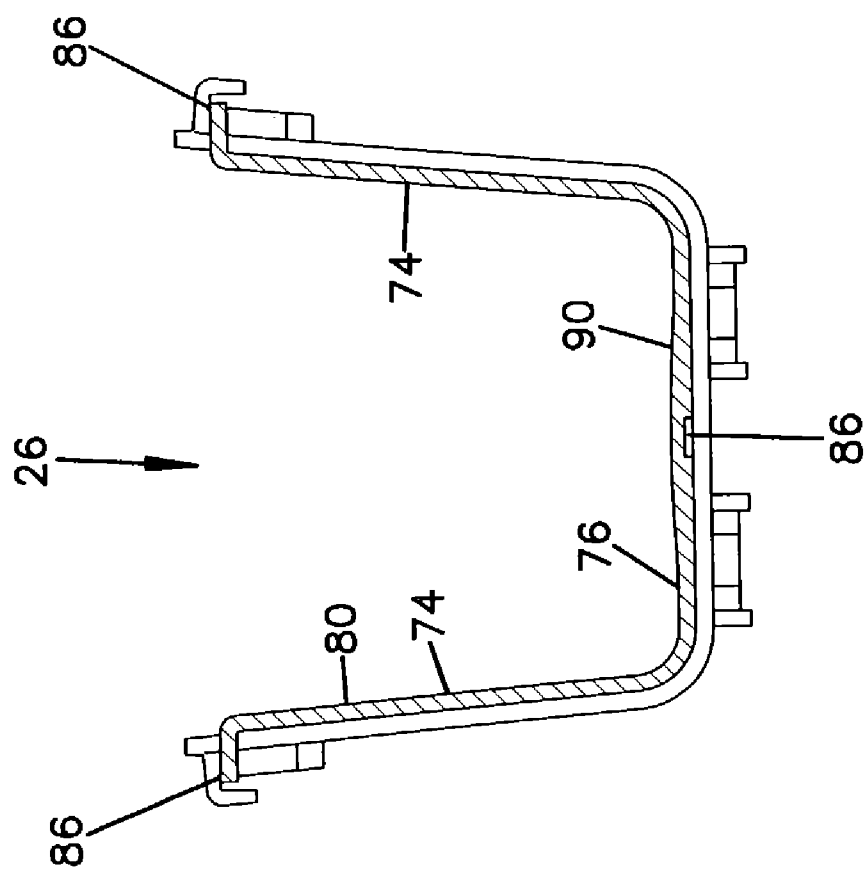
FIG. 16 is a cross-sectional end view of the second trough section, taken along lines 16-16 of FIG. 15.

Base wall section 76 of second trough section 26 includes an elongated slot 86 for receipt of tab 56 of first trough section 24 (see FIG. 9). The interaction of tab 56 and slot 86 keeps second trough section 26 from being separated from first trough section 24 and further defines the maximum length of trough 12. Ramp surface 58 allows for the two trough sections 24, 26 to be mounted together during assembly by aligning the two parts (receiving end 70 inside receiving end 40, and flanges 82 aligned with slots 54) and pressing them together in the axial direction. Once tab 56 is positioned in slot 86, shoulder 60 prevents the two pieces from being separated. Preferably first and second trough sections 24, 26 are made from molded plastic. Tab 56 can be separated from slot 86 by manually pressing base wall section 46 away from base wall section 76.

Base wall section 76 of second trough section 26 preferably includes a middle thickened area 90, which allows for convenient molding from plastic. Middle thickened area 90 provides an increased thickness in portions of second trough section 26 adjacent to slot 86. Thickened area 90 promotes material flow during molding. Receiving end 70 of second trough section 26 preferably includes a tapered receiving end 94, to help protect fiber optic cables contained within telescoping trough 12 from contacting any sharp edges. End 94 tapers to a minimum wall thickness at end 70. Second trough section 26 further includes an enlarged terminal end 98 relative to a reduced central section 99 and receiving end 70 which allows for terminal end 72 to have a similar coupling profile as terminal end 42 of first trough section 24. Enlarged terminal end 98 also provides a stop for limiting the minimum length of trough 12.

The above specification, examples and data provide a complete description of the manufacture and use of the invention. Since many embodiments of the invention can be made without departing from the spirit and scope of the invention, the invention resides in the claims hereinafter appended.

What is claimed is:

1. A method of assembling a cable routing system comprising the steps of:

providing first and second U-shaped spaced apart end members;

providing a telescoping U-shaped trough with first and second trough sections, the first and second trough sections each having a terminal end and a receiving end, the receiving ends of the first and second trough sections being in sliding contact with one another, the terminal ends of the first and second trough sections having the same connecting configuration such that the telescoping U-shaped trough is reversible;

positioning the reversible telescoping U-shaped trough between the first and second end members; and connecting the terminal ends of the first and second trough sections of the reversible telescoping U-shaped trough to the first and second end members, wherein the receiving ends of the first and second trough sections remain freely slideable relative to one another during use of the completely assembled cable routing system so that the first and second trough sections slide relative to one another when only one terminal end of one of the first and second trough sections is disconnected from the respective first and second end member.

2. The method of claim 1, wherein the step of providing the telescoping U-shaped trough includes providing the first and second trough sections in sliding contact, sliding movement of the first and second trough sections being limited between a maximum extension position and a minimum extension position to prevent separation of the first and second trough sections.

3. A method of assembling a cable routing system comprising the steps of:
  providing first and second end members, the end members being spaced apart a fixed distance;
  providing a telescoping cable trough with first and second trough sections having joined ends, the joined ends of the first and second trough sections being in sliding contact with one another;
  positioning the telescoping cable trough between the first and second end members; and
  selectively connecting the first trough section to either one of the first and second end members, the first trough section being connectable to both of either one of the first and second end members; and
  connecting the second trough section to the other of the first and second end members;
  wherein the joined ends of the first and second trough sections remain freely slideable relative to one another during use of the completely assembled cable routing system so that the first and second trough sections slide relative to one another when only one connected end of one of the first and second trough sections is disconnected from the respective first and second end member.

4. The method of claim 3, wherein the step of selectively connecting the first and second trough sections to the first and second ends members includes connecting the first trough section to the first end member.

5. The method of claim 3, wherein the step of selectively connecting the first and second trough sections to the first and second ends members includes connecting the first trough section to the second end member.

6. The method of claim 3, wherein the step of providing a telescoping cable trough includes providing a telescoping cable trough with first and second slideable trough sections having substantially the same coupling profile for selectively coupling one of the first and second trough sections to either of the first and second end members.

7. The method of claim 3, further including sliding the trough sections relative to one another to fit between the first and second end members.

8. The method of claim 7, further including engaging flanges of the second trough section with slots formed in the first trough section and sliding the trough sections relative to one another.

9. The method of claim 7, further including sliding the trough sections relative to one another until a slot and tab connection of the telescoping cable trough stops further sliding movement.

10. The method of claim 3, further including varying an overall length of the telescoping cable trough during assembly by:
  a) retracting the telescoping cable trough to position the cable trough between the first and second end members; and
  b) expanding the telescoping cable trough to connect the first and second sections to the first and second end members.

11. The method of claim 3, wherein the step of providing the telescoping cable trough includes providing the first and second trough sections in sliding contact, sliding movement of the first and second trough sections being limited between a maximum extension position and a minimum extension position to prevent separation of the first and second trough sections.

12. A method of assembling a cable routing system comprising the steps of:
  providing first and second cable trough members, each of the cable trough members having ends;
  providing a telescoping trough with first and second trough sections, the first and second trough sections being in sliding contact with one another, sliding movement of the first and second trough sections being limited between a minimum extension position and a maximum extension position by a tab and slot connection, the tab and slot connection preventing sliding separation of the first and second trough sections while permitting sliding contact of the first and second trough sections between the minimum extension position and the maximum extension position;
  positioning the telescoping trough between the ends of the first and second cable trough members; and
  connecting the first and second trough sections to the ends of the first and second cable trough members, wherein the first and second trough sections remain freely slideable upon disconnecting at least one of the first and second trough sections from the respective end of the first and second trough members.

13. The method of claim 12, wherein the step of providing the telescoping trough includes providing a U-shaped telescoping trough.

14. The method of claim 12, wherein the step of providing the telescoping trough includes providing a telescoping trough with first and second trough sections having substantially the same coupling profile for selectively coupling one of the first and second trough sections to either of the ends of the first and second cable trough members.

15. The method of claim 12, further including sliding the trough sections relative to one another to fit between the ends of the first and second cable trough members.

16. The method of claim 15, further including engaging flanges of the second trough section with slots formed in the first trough section and sliding the trough sections relative to one another.

17. The method of claim 15, further including sliding the trough sections relative to one another until the slot and tab connection of the telescoping trough stops further sliding movement beyond the maximum extension position.

18. The method of claim 15, further including sliding the trough sections relative to one another until the tab and slot connection of the telescoping trough stops further sliding movement beyond the minimum extension position.

19. The method of claim 12, further including varying an overall length of the telescoping trough during assembly by:
  a) retracting the telescoping trough to position the telescoping trough between the ends of the first and second cable trough members; and
  b) expanding the telescoping trough to connect the first and second trough sections to the ends of the first and second cable trough members.

* * * * *